(12) United States Patent
Bertazzoli

(10) Patent No.: US 9,388,883 B2
(45) Date of Patent: Jul. 12, 2016

(54) CONTINUOUSLY VARIABLE TRANSMISSION

(76) Inventor: Jose Luiz Bertazzoli, Sao Paulo (BR)

( * ) Notice: Subject to any disclaimer, the term of this patent is extended or adjusted under 35 U.S.C. 154(b) by 742 days.

(21) Appl. No.: 13/699,718

(22) PCT Filed: May 13, 2011

(86) PCT No.: PCT/BR2011/000143
§ 371 (c)(1),
(2), (4) Date: Apr. 4, 2013

(87) PCT Pub. No.: WO2011/147008
PCT Pub. Date: Dec. 1, 2011

(65) Prior Publication Data
US 2013/0184121 A1   Jul. 18, 2013

(30) Foreign Application Priority Data

May 24, 2010   (BR) ...................................... 1001768

(51) Int. Cl.
*F16H 15/42* (2006.01)
*F16H 29/04* (2006.01)

(52) U.S. Cl.
CPC ................ *F16H 15/42* (2013.01); *F16H 29/04* (2013.01)

(58) Field of Classification Search
CPC .................................. F16H 15/42; F16H 29/04
See application file for complete search history.

(56) References Cited

U.S. PATENT DOCUMENTS

| | | | | |
|---|---|---|---|---|
| 2,052,419 A | * | 8/1936 | Moore | F04C 2/101 418/21 |
| 4,492,539 A | * | 1/1985 | Specht | F04C 14/22 418/171 |

(Continued)

FOREIGN PATENT DOCUMENTS

| | | |
|---|---|---|
| BR | 9301842 A | 11/1994 |
| BR | 9604066 A | 6/1998 |
| BR | 0315187 A | 8/2005 |
| BR | PI 0407856 A | 2/2006 |
| EP | 0478514 A1 | 4/1992 |
| EP | 91830381.9 | 4/1992 |

(Continued)

*Primary Examiner* — David M Fenstermacher
(74) *Attorney, Agent, or Firm* — Seyfarth Shaw LLP; Brian Michaelis

(57) ABSTRACT

A continuously variable transmission essentially composed by a disc with a variable inclination articulated by an automatic servo-mechanism positioned in a driver axis is described. The inclined disc system activates a pivot using two opposed bearings fixed in the pivot. The pivot activates two alternative rods. A force transmitted by the rods is applied to a balancer, with a turn radius originating in the center line of a transversal axis positioned in the center of the transmission. One side of the transversal axis is installed in the interior of a semi-axis and transmits continuous rotation in only one direction using a sprag bearing. In the internal side of the set, there are external conical helical gears integral to the semi-axis. The exit-axis is an axis of a sprocket, positioned symmetrically between both gears, having a center line axial to the entrance axis of the transmission.

4 Claims, 5 Drawing Sheets

(56) References Cited

U.S. PATENT DOCUMENTS

| | | | | |
|---|---|---|---|---|
| 5,306,127 A * | 4/1994 | Kinney | ............ | F04C 14/185 418/21 |
| 5,724,812 A * | 3/1998 | Baker | ............ | F04C 14/185 418/21 |
| 6,126,420 A * | 10/2000 | Eisenmann | ............ | F04C 14/10 417/219 |
| 6,244,839 B1 * | 6/2001 | Cole | ............ | F04C 2/102 418/171 |
| 6,283,735 B1 * | 9/2001 | Schreiber | ............ | F04C 2/088 418/21 |
| 7,137,798 B2 * | 11/2006 | Gotschhofer | ............ | F04C 2/14 418/206.1 |
| 7,153,110 B2 * | 12/2006 | Schneider | ............ | F04C 14/10 418/159 |

FOREIGN PATENT DOCUMENTS

| | | |
|---|---|---|
| WO | 2004171452 A1 | 9/2004 |
| WO | 2006049500 A1 | 5/2006 |

\* cited by examiner

CONTINUOUSLY VARIABLE TRANSMISSION

BACKGROUND

Continuously Variable Transmissions (CVTs) are classified into the following three large groups according to functionality: friction transmissions, free-wheel (i.e., coming and going or oscillatory) transmissions, and hydrostatic transmissions.

Friction transmissions are classified as toroidal and as variable pulley, and have at least two rotating bodies having one contact point among them. The rotating bodies have the same tangential velocity, where the transmission rotation varies by changing the effective contact radium of both elements. Some classical examples of friction transmissions are: the Van Doorne metallic belts, the chained Van Doorne, the toroidal shift, Torotrak transmissions, the Extroid transmission, the Milner transmission, and the ringed-cone transmission, with all of them generally being small-sized and used in automotive vehicles, machinery, and other small-sized and low torque equipment.

Free-wheel transmissions, or coming and going or oscillatory transmissions, are transmissions in which the rotation in an entrance axis provides a determined mechanism and converts into an oscillatory movement of variable amplitude. This movement of coming and going is rectified with a free wheel in order to obtain a unidirectional rotation movement in an exit axis. Using several mechanisms in parallel, it is possible to transmit continuously and minimize undulation of the exit angle, thus minimizing the torque oscillation in the exit axis. These transmissions are not commonly used in the automotive industry due to the difficulty of configuration and exit speed inconsistency and subsequent vibration due to the intermittent torque transmission. Some classic examples of free-wheel transmissions are: the Lestraneng transmission, the Varibox transmission, the continuously variable IVPD transmission, the Constantinesca transmission, and the Transrevolution transmission.

Hydrostatic transmissions transform rotational energy of an entrance axis in fluid flow in a pump and later convert this fluid flow into a rotating movement of an exit axis by means of a hydrostatic engine or turbine. In these transmissions, sometimes the flow is varied through the variable output pump and in other times the output is controlled by control valves. Thus, the transmission relation of the system obtains an infinite array of velocities. This type of transmission has the advantages of having big configurations, which are usually used in utility mechanisms, tractors, and heavy vehicles, but they are not applied to high rotations. Some classic examples of hydrostatic transmissions are those that apply a variable pump with axial pistons activated by an inclined disc with variable angular inclination.

There are some documents that describe continuously variable transmissions destined for several applications, although none of these transmissions have the configuration, application, and functions described in this disclosure. Among these documents, it is worth mentioning the following:

BRPI 0315187-5, titled CONTINUOUSLY VARIABLE TRANSMISSION, describes a continuously variable transmission for use with engine run vehicles. The continuously variable transmission includes an electronic control unit, an automatic gear shift unit, an inverter, a set of entrance gears, an element of fixed entrance relation, and an element of fixed exit. The electronic control unit is configured to include rules of logic to control the transmission. The rules of logic include emitting control commands of the transmission.

BRPI 0407856-0, titled CONTINUOUSLY VARIABLE TRANSMISSION, describes the invention of a variable velocity transmission that has a plurality of inclination spheres (1), entrance discs (34), and exits (101) opposed to each other, which provides an infinite number of velocity combinations per its relation of transmission. The use of a set of planetary gears enables minimum velocities in the inversion and the unique geometry of the transmission allows that all of the power courses are coaxial. This reduces the general size and complexity of the transmission, in comparison to transmissions that reach ranges of relations in similar transmissions.

BRPI 9301842-8, titled OUTPUT VARIATION DEVICE IN ROTATING PUMPS OF POSITIVE OR VARYING DISPLACEMENT OF ROTATION SPEED IN HYDRAULIC AND PNEUMATIC ENGINES, AND HYDROSTATIC VARIATION OF ROTATION SPEED, is constituted of all and any mechanical element or set of elements that has the property of varying the useful width "I" (3), of internal and external gears, lobes, lobes with tooth, friction wheels, cubes, picks, bolts, etc. The element(s) comprise a rotating pump and/or hydraulic rotating engine and/or pneumatic with the junction of the variation device of the output in rotating pumps, and the device of rotation variation in hydraulic rotating engines and pneumatic, forming the hydrostatic variation of rotation speed.

BRPI 9604066-1, titled GEARS PUMP WITH VARIABLE OUTPUT BY THE AXIAL DISPLACEMENT PRINCIPLE OF THE MOVED, REVERSIBLE GEARS IN HYDRAULIC ENGINE, provides the pumping of fluids at a variable output without the need to vary the rotation speed of the starter and without the need to obstruct the consolidation output and the recirculation of the exceeding output to the suction pump, thereby saving fuel and rationalizing the controls of the hydraulic circuits. This principle consists in varying the positions of gears ("useful width") between the external teeth driver gears (4) and the driver gear (9), varying the volume pumped at each revolution. The driver gear (4) does not have longitudinal movement. When they are not geared, the opposite extremities from each other of the gears have empty spaces between the teeth, occupied by the internally teethed gears (3) and (10), preventing the internal recirculation of the fluid. The increase of the useful width is obtained by means of the internal hydrostatic forces; the decrease is obtained by the movement of the axis (8) and the journal bearing (2). Cooperation between them dislocates axially from left to right taking the internal teeth gears (3) and the moved gear (9) in the same direction. The internal teeth gear (10) does not move in the axial direction. The triggering of the mobile parts in the axial direction is obtained by means of hydraulic command using its own pumped fluid, recirculating it until the command mouth (15), or obtained by means of external mechanisms. The gear pump of variable output is reversible, with the possibility of being used as a hydraulic engine of variable rotation speed. In this case there is a constant output of fluid destined to transmit power to the axis of the mentioned hydraulic engine, being that the axis has its variable rotation speed due to the internal useful width of the engine, obtained by the same principle of gear pumps at variable output.

There are some other documents that can be cited like WO 2006049500, EP 0478514, EP 1991 0830381, U.S. Pat. No. 7,137,798, and U.S. Pat. No. 7,153,110.

SUMMARY

The object of the present disclosure, is a detailed description attached with illustrative figures, of a new equipment of continuously variable transmission (CVT), possessing several marketable applications and fulfilling an existing gap in the demand of continuously variable automatic transmissions with a torque superior to 150 Nm, and also for torques below 150 Nm. This product is the result of improvements in old concepts and the creation of new theoretical concepts. The resulting products have market application possibilities in general industry, as well as agricultural machines, off road vehicles, the naval industry, the automotive industry, eolic energy generators, and hydrokinetic energy generators. Regarding generator implementations, the CVT works as a mechanical regulator of angular velocity (rpm) associated with a multiplying box installed between the turbine (eolic or hydrokinetic) and the power generator.

BRIEF DESCRIPTION OF THE DRAWINGS

Next there are references to Figures that are attached to this descriptive report, for better understanding and illustration, in which:

FIG. 2 also highlights the moved axis, rods, and sprocket.

DETAILED DESCRIPTION

In the Figures and in the descriptive report the alphanumerical references represent the elements of the continuously variable transmission object of the present disclosure, clarifying and enlightening the description, where: A=motive axis; B=bearings; C=servo-mechanism; D=pivot. E=rod; F=balancer; G=sprocket; H=moved axis; I=inclined disc; K=conical gear; L=sprag bearing; M=transversal axis; P=semi-axis; R=gravity center; S=piston; T=External square key; and V=Internal square key.

A non-restrictive preferential form is described for the realization of the present object of this disclosure, in which the configuration and application can vary in form for each desired model, describing one of the constructive possibilities that lead to the concretization of the described project and the way it functions.

Figure 1:
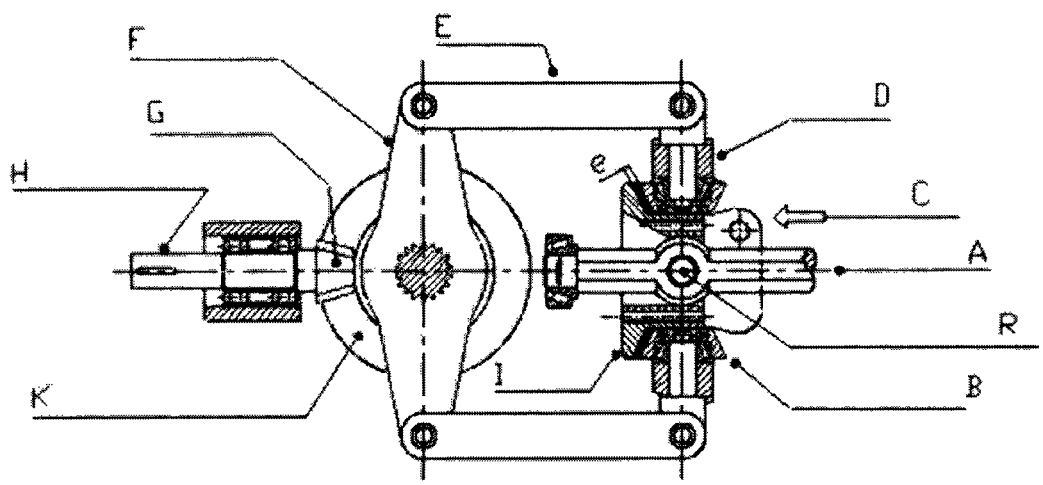
FIG. 1 shows part of the configuration of the continuously variable transmission object of the present disclosure focusing on the inclined disc and the balancer, seen in a longitudinal cut, positioned at 90 degrees (a=0.0) in relation to the driver axis, or entrance axis, when the angular speed at the exit is equal to zero, independently from the angular velocity in the entrance. It also highlights the moved axis, rods and sprocket.
Figure 2:
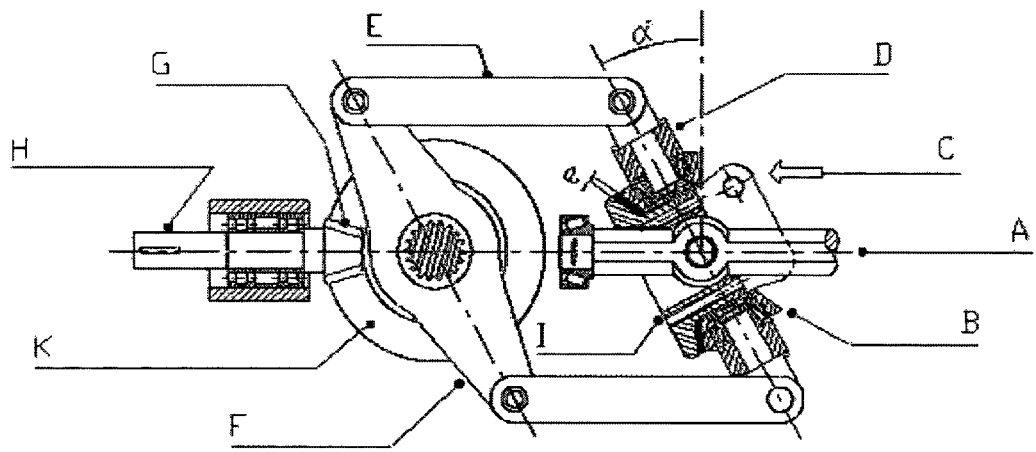
FIG. 2 shows the configuration of the continuously variable transmission object of the present disclosure focusing on the inclined disc and the balancer, seen in a longitudinal cut, at an angle of a=28.3° in relation to the perpendicular axis to the driver axis, or entrance axis, when the transmission relation is equal to 1.3, and where the maximum angular velocity in the exit is equal to 1.3 times the angular velocity at the entrance.
Figure 3:
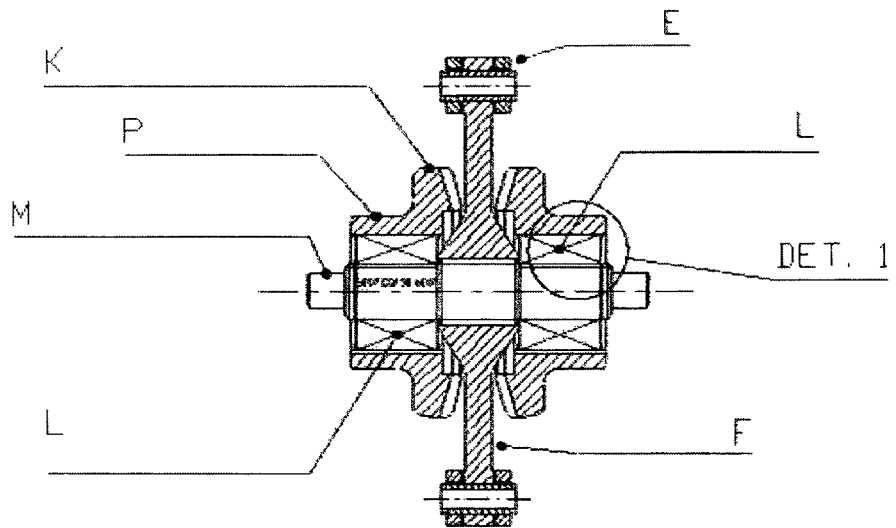
FIG. 3 shows part of the configuration of the continuously variable transmission object of the present disclosure focusing on the transversal axis, the left and right conic gears, each one integral to a semi-axis, the balancer in the center, and the left and right one-way bearings lodged in each semi-axis.
Figure 4:
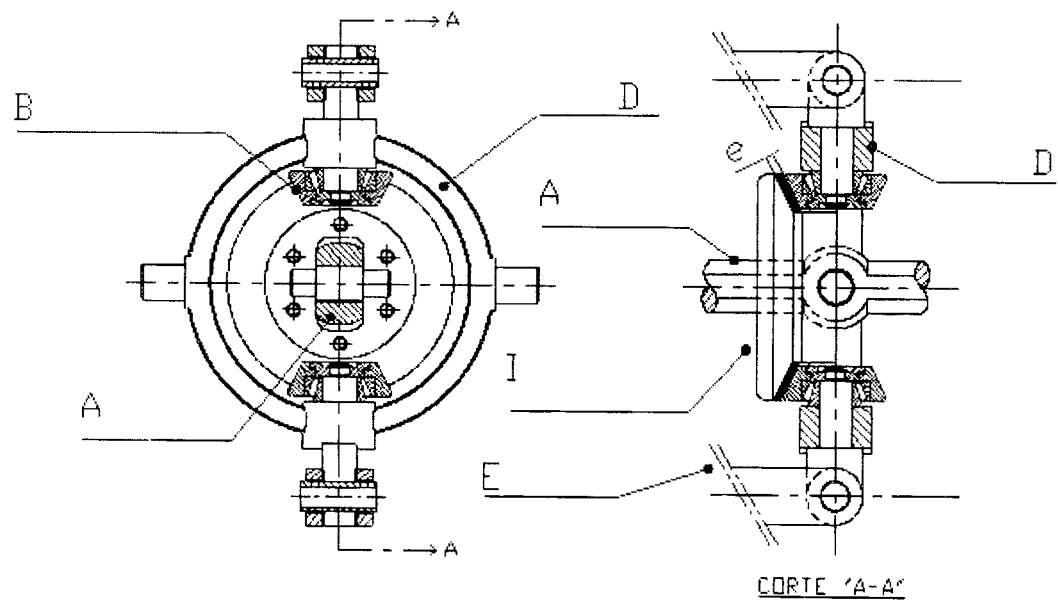
FIG. 4 shows part of the configuration of the continuously variable transmission object of the present disclosure highlighting the pivot (D) with an inclined disc (I) in the center and two bearings (B) that transfer oscillatory movement of the inclined disc to the pivot and from the pivot to the rods.
Figure 5:
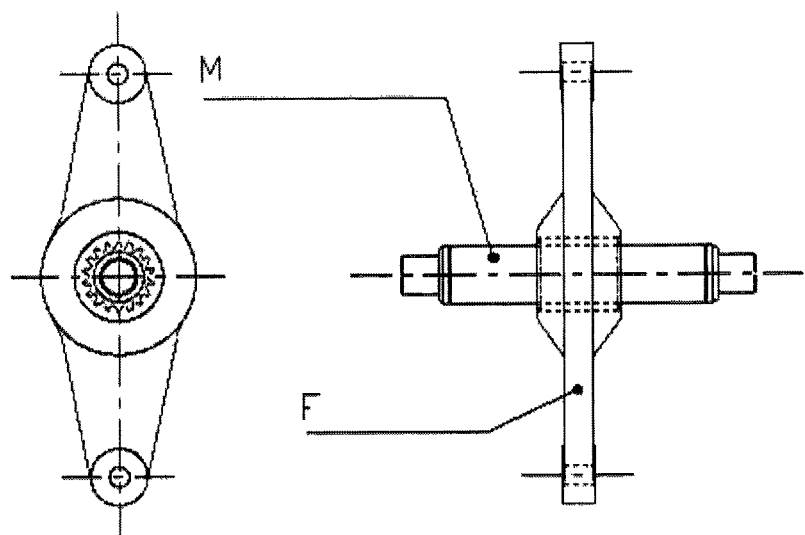
FIG. 5 shows part of the configuration of the continuously variable transmission object of the present disclosure highlighting the balancer (F) and the transversal axis (M).
Figure 6:
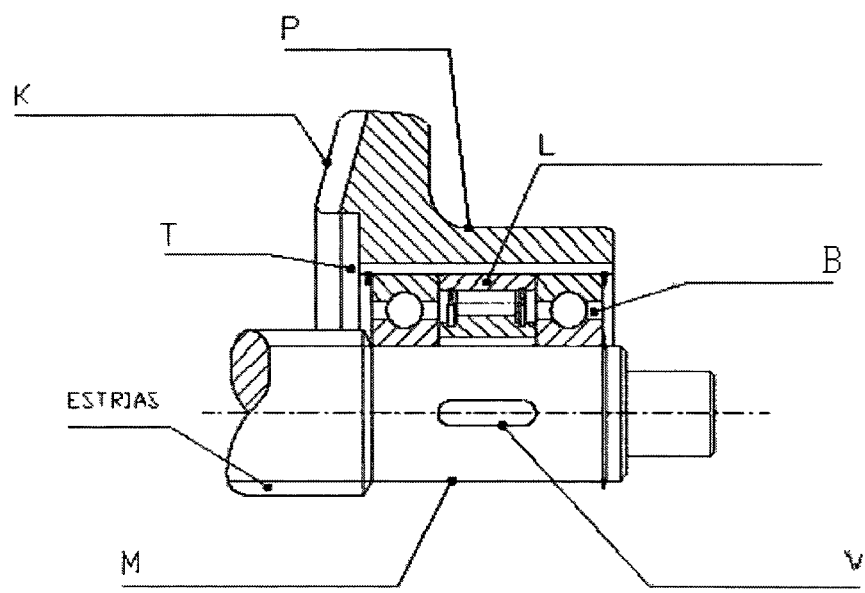
FIG. 6 shows part of the configuration of the continuously variable transmission object of the present disclosure highlighting the detail no. 1 indicated on FIG. 3, which shows the assembly of the one-way bearing (sprag bearing) (L) between two sphere radial bearings, hence constituting two opposing journal bearings that transfer the unidirectional movement of the transversal axis to each semi-axis. This is integral to the conical gear being that both unidirectional bearings possess an inverted rotation direction, making both conical gears with an inverted rotation direction, transfer the continuous rotation movement to the sprocket (G), and this to the moved axis (exit axis) (H).
Figure 7:
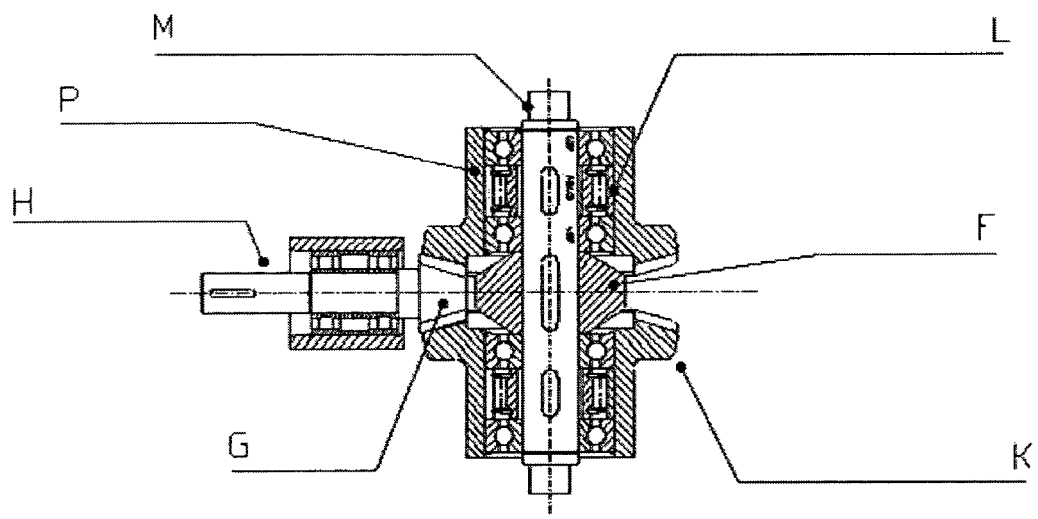
FIG. 7 shows a schematic view of the longitudinal cut that represents the transversal axis, both unidirectional bearings, the balancer, both conical gears, the sprocket, and the moved axis (or exit) object of the present disclosure.
Figure 8:
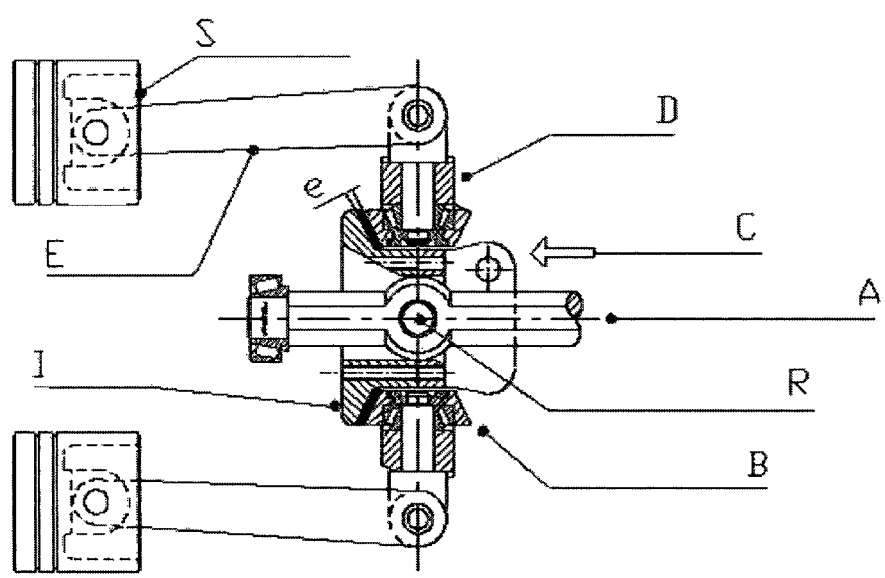
FIG. 8 shows part of the configuration of the continuous variable transmission object of the present disclosure highlighting the driver axis, inclined disc, the pivot, the rods, and the pistons (S), when these components are applied in the project and fabrication of products as in the case of air compressors and cooling gas, which seek energy savings. The quantity of generated mechanical work is balanced with the demand by means of the disc inclination which is commanded by sensors that measure this demand in real time. This configuration enables the substitution of the onerous frequency inversions of the electrical engine, also avoiding the peaks of a starter chain of the electrical engine. In this case the rods directly activate the pistons of the alternative compressor, dismissing the use of the unidirectional bearings (sprag bearing), being that the return of the pistons occurs due to the application of the rods' force in both directions, instead of what happens with pumps of axial pistons of the inclined disc, which need an external fluid pressurization system nest to the suction, to obtain this return.

The continuously variable transmission (CVT) object of the present disclosure has as functional characteristics, the use and improvement of two known function principles. The first principle, also used in pumps with variable axial pistons in high pressure oil-hydraulic circuits, is one that converts variable or constant rotating movement, in alternative movement controlled in real time, by means of a disc with variable angular inclination, which is articulated by means of an automatic service-mechanism (illustrated in FIGS. 1C and 2C). The automatic service-mechanism is positioned in the driver axis, in which the triggering of the primary machine comes from. The inclined disc system was modified and, instead of triggering the axial pistons, it triggers an oscillatory ring, or pivot (FIG. 4) by means of two opposing bearings fixed in the pivot (FIGS. 1B, 2B and 4B). The pivot triggers both transmission alternative elements of opposite forces, called rods (E).

Figure 9:
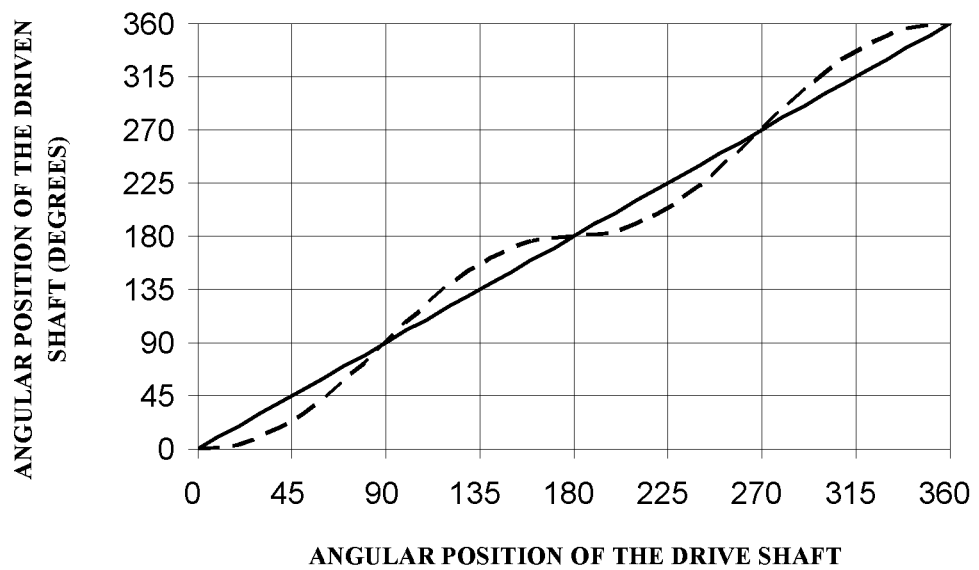
FIG. 9 shows a chart that represents the angular position of the driver axis and drive shaft from the continuously variable transmission when the transmission relation is equal to 1.0 (the number of turns of the driver axis is equal to the number of turns of the moved axis) and the behavior of the angular position in the interval of a complete turn, between zero and 360°, during the movement transmission between them. By analogy, the same chart represents the torque transference behavior between the driver axis and drive shaft. The dashed curve shows the behavior of the transmission relation when the bearing surface of the inclined disc is plain, with no ramp, and the consequent torque oscillation. The solid line represents the ideal condition, when the ramp is introduced in the inclined disc, with a width equal to "e", as shown in FIGS. 1,2 and 4. This width, which is not uniform, varies the function of the angular position of the contact point between the surfaces of the inclined disc (I) and the bearings (B) of the pivot and acts in all of the point contacts of the circumference of the inclined disc, in a sense of compensating the advances or delays in angular velocity, guaranteeing that the angular position of the exit axis follows the same position of the entrance axis during all of the extension of the 360° turn and thus guaranteeing the continuity of the torque, working free from oscillations and vibration.

In this configuration, the improvement according to the present disclosure results in the creation of two new concepts: the application of force in both directions of the movement (coming and going), with the introduction of the oscillatory ring (or pivot) that involves the angular inclined disc; and the introduction of a variable over-width in the point of contact between the angular inclined disc and the bearings (dimension "e"—FIGS. 1, 2, 4, and 8) to rectify the exit torque (illustrated in FIG. 9).

The second function principle, improved and used in this project, is used in free-wheel transmissions, in which reconversion takes place by means of a one-way bearing, or sprag (turnpike) bearing, installed in the unidirectional journal bearing of the alternative movement, variable course rods, which have rotating movement of controlled velocity. The force transmitted by the rods is applied to an arm of an opposite lever, called a balancer (F), with a rotation radium in the Center line of a transversal axis to the driver axis (M), positioned in the center of the transmission. The balancer transfers the angular oscillatory movement to the transversal axis. The transversal axis turns from zero until the required angle by the transmission relation, always inferior to 180°, returns to zero. The turn direction of the transversal axis inverts itself when it reaches the maximum and minimum limits. Every 180° turn from the driver axis corresponds to a transmission cycle of torque to the transversal axis. The amplitude of the cycle is the function of the inclination angle of the disc, (illustrated as α in FIG. 2) and determines the transmission relation, "i". One side of the transversal axis is installed in the interior of a semi-axis (P) and transmits a continuous rotation in only one direction by means of a one-way bearing (sprag bearing) (L). On the other side, symmetrically and in a same position in the reverse plain, there is another semi-axis, identical and with the same function, but with an opposite rotation direction, obtained by the inverted assembly of the sprag bearing (L). In the extremity of each semi-axis, in the internal side of the set, there are external conical helical gears (K), integral to the semi-axis. The exit axis (H) is the own axis of a sprocket (G), symmetrically positioned between both gears, having a center line shown in the figures as being axial to the entrance axis of the transmission. Alternatively, it can have a lateral exit at 90° or inclined with relation to the entrance axis. The sprocket receives the torque from one of the gears when the driver axis turns in the first and second quadrants, and the other gear when the driver axis turns in the third and fourth quadrants doing it successively.

The innovation introduced in this second principle is characterized by creating two other new concepts: (1) the amplitude of the cycle is a function of the inclination angle of the disc and determines the transmission relation, "i", and the reduction or multiplication of rotation speed is transfinite, or continuously variable, within an interval of rotations, with only three gears, since each 360° turn of the motive axis corresponds to two application cycles of torque in the moved axis when i=1.0; and (2) the rotation speed of the moved axis (or exit) can start from zero to the maximum adopted value of each project independently from the rotation speed of the driver axis, dismissing the clutch or hydrodynamic converter of a conjugated starter.

Thus, the continuously variable transmission object of the present disclosure describes a movement mechanism that reduces exit rotation to zero and multiplies it until 1.3 in the same configuration, not depending on the rotation speed of the entrance axis. The transmission is destined to several applications, presenting a new and unique configuration providing great advantages in relation to already existing transmissions used and found at the moment.

One advantage is the fact that it is a more versatile product regarding market segments, with possibilities of applications in agitators of a typical vertical cylindrical chemical reactors, where the use of CVT dismisses the commonly used planetary reducer, because its transmission relation, "I", starts from zero and reaches a wide range of rotations. An advantage also relates the fact that it can be used in eolic generators (aerial generators) or hydrokinetic generators for the conversion of kinetic energy river currents into electric energy, wherein a gear box multiplies the rotation of the turbine axis (eolic or hydrokinetic) that turns in low rotation and in unstable velocity due to the instability in flow velocity. Moreover, the transmission of the present disclosure may be used for for high torque automotive mechanical transmissions because of the fact that it starts from zero, dismisses the use of a clutch or conjugated hydrodynamic converter, and decreases manufacturing and maintenance costs. A further advantage is the possibility of using it in other segments of the industrial market, such as mining, the cement industry, management of materials, harbor installations, water treatments, plastic, rubber, paper and cellulose, paint, food, beverage, tobacco industries, agro-industry in general, etc. Still further, the concept of an inclined disc can also be applied, that would transmit to the rods an alternate movement with controlled extension in real time, to indirectly benefit other products, as in the case of the market of modern air compressors and cooling gas that, for energy saving, currently control rotation through frequency inversions of the electric engine, with the objective of balancing the demand and quantity of generated work. This avoids peaks of starter chain of the electric engine. In this case the rods activate, directly, the pistons of the alternative compressor, dismissing the use of unidirectional bearings of the sprag bearing.

The continuously variable transmission of the present disclosure is a mechanism essentially composed of an inclined disc (I), with an articulation in its center of gravity (R), and with an inclination up to 28.3° (a=28.3°). The disc is faced with two directly opposed bearings (B) installed in a pivot (D). The bearings receive oscillatory movement of the inclined disc caused by the rotation of the driver axis (A), and transmit this movement to the pivot, which in its turn transfers the same movement to the rods (E). The force of the oscillatory axial movement by the rods (E) is applied to an arm of opposed levers, called the balancer (F), with a turn radius originating in the center line of a transversal axis to the driver axis (M), positioned symmetrically in the center of the transmission. The transversal axis spins from zero to the angle required by the transmission relation, which is always inferior to 180°, and returns to zero. The direction of the spin of the transversal axis is inverted when the maximum and minimum limits are reached. Each 180° spin of the driver axis corresponds to a cycle of torque transmission to the transversal axis, when "a" goes from 28.3° to 28.3°. Thus, the cycle amplitude is the function of the inclination angle of the disc (a) and determines the transmission relation, "i". One side of the transversal axis is installed in the interior of a semi-axis (P) and transmits to it continuous rotation in only one direction, by means of a one-way bearing (sprag bearing). On the other side, in a symmetrical and rebated position in the reverse plain, there is another semi-axis, identical and with the same function, but with a sense of opposite rotation. In the extremity of each semi-axis, in the internal side of the set, there is an external conical gear integral to the semi-axis (K). The exit axis (H), is the axis of a sprocket (G), positioned symmetrically between two gears, which has a center line which is axial to the entrance axis of the transmission. The sprocket receives the torque from one of the gears when the driver axis turns in the first and second quadrants (from zero to 180°), and the other gears when the entrance axis turns in the second and third quadrants (from 180° to 360°), etc. The disc inclination occurs by the axial movement of a servo-mechanism (C) composed basically by two pulse generators. One measures the angular velocity of the driver axis and the other the angular velocity of the moved axis. The analogical signals, from 4 to 20 mA (or 5 to 10 V), are transmitted to a signal transducer and to a driver that commands a pace engine. This triggers an endless screw sprocket, that triggers two crowns simultaneously and these trigger two spherical fuses that move an articulated lever in the indicated locations of FIGS. 1 (C) and 2 (C). The command of the servo-mechanisms of the disc inclination can be manual, by means of activation of a linear potentiometer, or a capacitive ruler, which positions the pace engine, or automatic through PLC that positions the pace engine by comparison and processing of variables (i.e., velocity, torque, electric current frequency, viscosity of reactor fluid, etc.). The command of the servo-mechanism can be controlled by means of a control algorithm that establishes, in real time, the transmission relation to be adjusted, resulting essentially in a manual or automatic continuously variable mechanical transmission that adjusts the exit rotation in real time in function of the entrance rotation. The control grid is programmed in a dedicated processor (PLC), which is an integral part of the continuously variable automatic transmission of the present disclosure by means of a specific algorithm for each use, thus constituting the equipment for several applications.

Thus, by the configuration, characteristics, applications, and functioning above described, it can be clearly noticed that the CONTINUOUSLY VARIABLE TRANSMISSION is a new equipment and it is unique for the state of technique, in which is full of innovation conditions, inventive activity, and unseen industrialization, which makes it worthy of the Patent of Invention Privilege.

The invention claimed is:

1. A continuously variable transmission comprising:
an inclined disc system including a disc with a variable inclination articulated by an automatic servo-mechanism positioned in a driver axis in its center of gravity by means of a transversal pin to the driver axis, a main axis caused by a rotational activation of a primary machine, the inclined disc system activating an oscillatory ring by means of two opposed bearings fixed in a pivot, the pivot activating two alternative elements of opposed power transmission, a force transmitted by the two alternative elements is applied to an arm of opposing levers, a turn radius originates in a center line of a transversal axis positioned in a center of the transmission, wherein the arm of opposing levers transfers angular oscillatory movement to the transversal axis, wherein re-conversion of the alternative movement in rotating movement of controlled velocity happens with sprag bearings installed between two radial bearings in unidirectional bearings, wherein the unidirectional bearings are constituted by a transversal axis to the transversal axis, wherein one side of the transversal axis is installed in an interior of a semi-axis and transmits continuous rotation in one direction by means of a sprag bearing, wherein another side of the transversal axis transmits an opposite rotation direction due to an inverted assembly of the sprag bearing, external conical helical gears located at extremities of each semi-axis, wherein an exit axis is an axis of a sprocket and is positioned symmetrically between the external conical helical gears, wherein the exit axis is axial to an entrance axis of the transmission, wherein the sprocket receives torque from one of the external conical helical gears when the driver axis turns in first and second quadrants, and wherein another of the external helical gears provides the sprocket with torque when the driver axis turns in third and fourth quadrants.

2. The continuously variable transmission according to claim 1, wherein a portion of the transmission applies force in two directions of alternative movements of the two alternative elements of opposed power transmission with introduction of the oscillatory ring.

3. The continuously variable transmission according to claim 1, wherein part of the transmission introduces an over-width face of the inclined disc with variable measurement in a contact point between the inclined disc and bearings of the pivot wherein every angular position of the driver axis corresponds to a different width of the inclined disc, the width varying in function based on angular position of the contact point between surfaces of the inclined disc and pivot bearings.

4. The continuously variable transmission according to claim 1, wherein part of the transmission possesses infinite transmission relations within an interval of rotations, wherein a rotation velocity of a moved axis starts from zero and ends at a maximum value independently from rotation velocity of the driver axis.

* * * * *